(12) United States Patent
Farooq (10) Patent No.: US 7,318,503 B2
(45) Date of Patent: Jan. 15, 2008

(54) PAD RETAINING CLIPS

(75) Inventor: Muhammad Farooq, Farmington Hills, MI (US)

(73) Assignee: Akebono Corporation (North America), Elizabethtown, KY (US)

(*) Notice: Subject to any disclaimer, the term of this patent is extended or adjusted under 35 U.S.C. 154(b) by 175 days.

(21) Appl. No.: 10/831,928

(22) Filed: Apr. 26, 2004

(65) Prior Publication Data

US 2005/0236236 A1    Oct. 27, 2005

(51) Int. Cl.
*F16D 65/04* (2006.01)

(52) U.S. Cl. .............................. 188/73.36; 188/73.31; 188/205 A (58) Field of Classification Search ............ 188/73.35, 188/73.36, 73.37, 73.38, 205 A, 73.43, 73.44, 188/71.1, 73.34, 73.33, 73.32, 73.31, 73.39, 188/250 G See application file for complete search history.

(56) References Cited

U.S. PATENT DOCUMENTS

| | | | |
|---|---|---|---|
| 4,222,465 A * | 9/1980 | Haraikawa et al. ...... | 188/73.34 |
| 4,351,421 A | 9/1982 | Kurata et al. | |
| 4,408,681 A | 10/1983 | Oshima | |
| 4,460,067 A | 7/1984 | Katagiri et al. | |
| 4,533,023 A * | 8/1985 | Carre et al. .............. | 188/73.38 |
| 4,538,708 A * | 9/1985 | Seki .......................... | 188/73.38 |
| 4,936,422 A | 6/1990 | Mery et al. | |
| 5,025,897 A | 6/1991 | Hirashita et al. | |
| 5,069,313 A | 12/1991 | Kato et al. | |
| 5,073,099 A | 12/1991 | Kayano | |
| 5,377,790 A | 1/1995 | Tsuruta | |
| 5,472,067 A | 12/1995 | Fujiwara | |
| 5,549,181 A | 8/1996 | Evans | |
| 5,699,882 A | 12/1997 | Ikegami et al. | |
| 6,003,642 A | 12/1999 | Mori et al. | |
| 6,269,915 B1 | 8/2001 | Aoyagi | |
| 6,286,636 B1 | 9/2001 | Iwata | |
| 6,367,594 B1 | 4/2002 | Barbosa et al. | |
| 6,378,666 B1 | 4/2002 | Yoko | |
| D473,127 S * | 4/2003 | Yoko ........................... | D8/395 |
| 7,152,717 B2 * | 12/2006 | Lelievre et al. .......... | 188/73.38 |

FOREIGN PATENT DOCUMENTS

| | | | |
|---|---|---|---|
| GB | 2 036 898 A | | 7/1980 |
| JP | 58-39823 | | 3/1983 |
| JP | 63162356 A | | 7/1988 |
| JP | 06117463 A | * | 4/1994 |
| JP | 08261261 A | * | 10/1996 |
| JP | 2000-249175 | * | 9/2000 |

* cited by examiner

*Primary Examiner*—Thomas Williams
(74) *Attorney, Agent, or Firm*—Dobrusin & Thennisch PC (57) ABSTRACT

A brake caliper mounting clip is disposed between a brake caliper having a brake pad channel and a brake pad having an edge member. The edge member moves in the brake pad channel between a rotor gap and a caliper housing. The clip further comprises a pad holding portion slidingly engaged with the edge member and having a plurality of pad retaining members. The pad retaining members are connected to the pad holding portion and disposed between the edge member and the rotor gap. The plurality of the pad retaining members is further configured to prevent the brake pad from falling into the rotor gap. Additionally the edge member of the brake pad and the plurality of pad retaining members are configured to prevent improper installation of the brake pads in the caliper.

20 Claims, 10 Drawing Sheets

Prior Art

PAD RETAINING CLIPS

FIELD OF THE INVENTION

The present invention relates to a brake caliper mounting clip and, more particularly, to a plurality of brake pad retaining members formed on the mounting clip.

BACKGROUND OF THE INVENTION

In a conventional disc brake system, a pair of brake elements with friction members is slidably mounted on a caliper to forcibly press against a rotor to effect braking and slow the vehicle. Because the caliper moves the friction members into contact with the rotor surfaces, one or more mounting clips are installed between the brake elements and an interior of the caliper in order to reduce the sliding resistance.

The disc brake systems are typically shipped with the brake elements and the mounting clips already installed in the caliper. Accordingly, a disc brake system customer simply installs the disc brake system onto the vehicle. It will be appreciated that in shipping, the rotor is absent from the brake system. Because the rotor is absent, the brake elements are able to move within the brake caliper to a greater degree than if the rotor were present. It will also be appreciated that brake elements are commonly referred to as brake pads or disc brakes and may be referred to as such.

The area in which the rotor would have occupied adjacent to the caliper is known as a rotor gap or a rotor clearance gap. The brake elements, otherwise not restrained by the presence of the rotor, may fall into the rotor gap during shipping of the brake system. If the brake elements fall into the rotor gap, re-installation becomes necessary. In a large volume assembly process, it may be possible that the brake elements could be installed improperly, such that the friction members, for example, do not properly face the rotor.

A plastic "T" or a sponge spacer is placed in the caliper to prevent the brake pads from falling into the rotor gap. The brake pads can nevertheless fall into the rotor gap when the plastic "T" or the sponge spacer is removed during installation of the brake caliper. The difficulty in keeping the brake pads installed and positioned properly in the caliper during shipping and installation may cause increases in parts count, assembly costs and installation time. Moreover, attempts to re-install the brake pads, once they have moved from the proper position, may result in an improper re-installation of the brake pads.

SUMMARY OF THE INVENTION

In the various embodiments of the present invention, a clip is disposed between a brake caliper with a brake pad channel and a brake pad with an edge member. The edge member moves in the brake pad channel between a rotor gap and a caliper housing. The clip further comprises a pad holding portion slidingly engaged with the edge member. In addition, the clip has a plurality of pad retaining members. The pad retaining members are connected to the pad holding portion and disposed between the edge member and the rotor gap. The plurality of the pad retaining members is further configured to prevent the brake pad from falling into the rotor gap.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the various embodiments is merely exemplary in nature and is in no way intended to limit the invention, its application, or uses.

Figure 1:
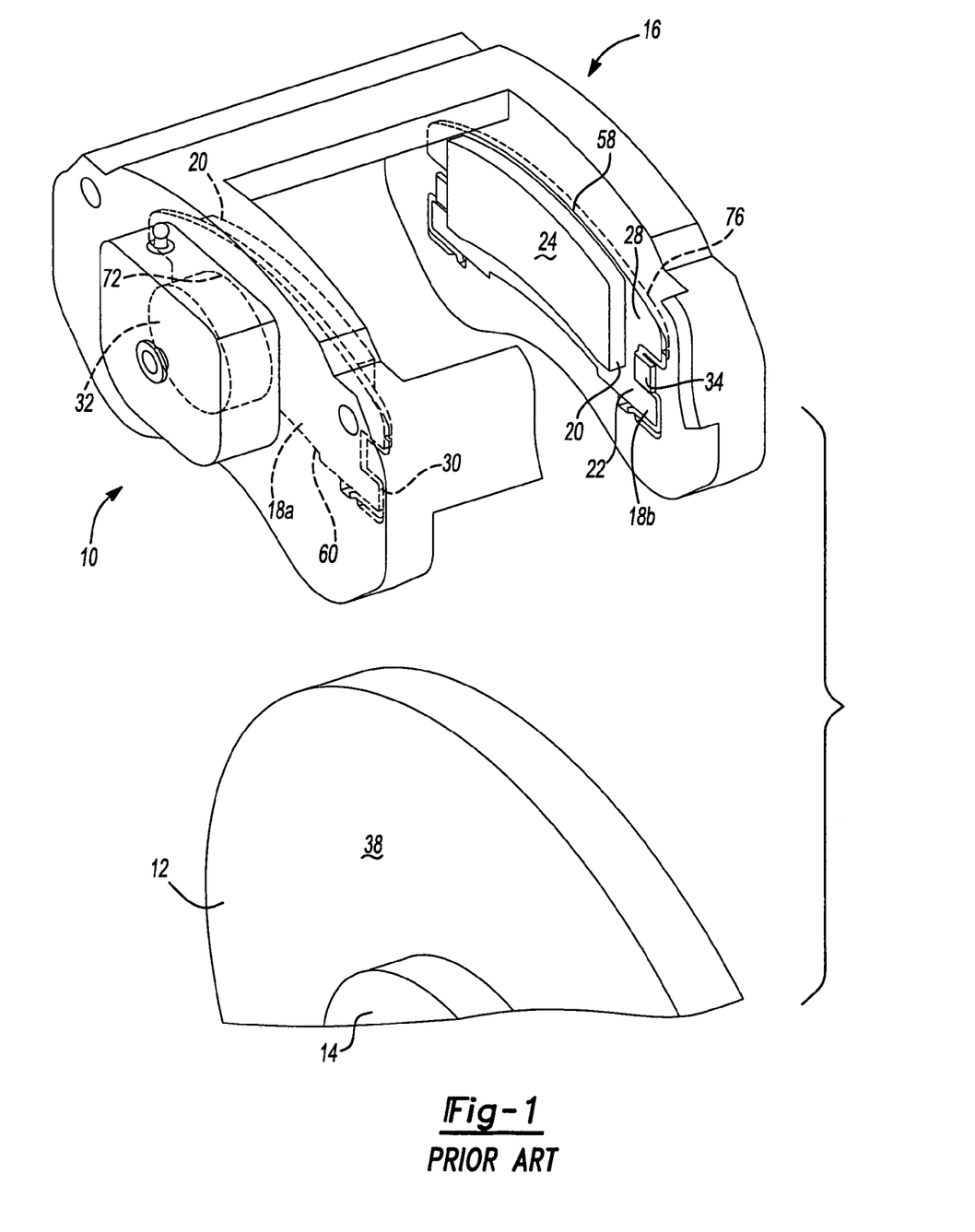
FIG. 1 is a partial perspective view of a conventional brake caliper assembly.

In FIG. 1, the various embodiments of the present invention are shown with reference to a simplified and exemplary vehicle disc brake system generally indicated by reference numeral 10. The disc brake system 10 includes a rotor 12 having a hub 14 configured to fit into a caliper 16. The disc brake system 10 also includes an inboard brake element 18a an outboard brake element 18b, respectively referred to hereinafter as brake elements 18 or may be referred to as brake pads 18 or disc brakes 18. It will be appreciated that the brake system 10 is shown in a simplified fashion and may be commonly referred to as a caliper assembly 10. To that end, a more detailed explanation of an exemplary disc brake system is disclosed in commonly assigned U.S. Pat. No. 4,351,421, titled Disc Brake filed Jul. 18, 1980, which is hereby incorporated by reference as if fully set forth herein.

Figure 2:
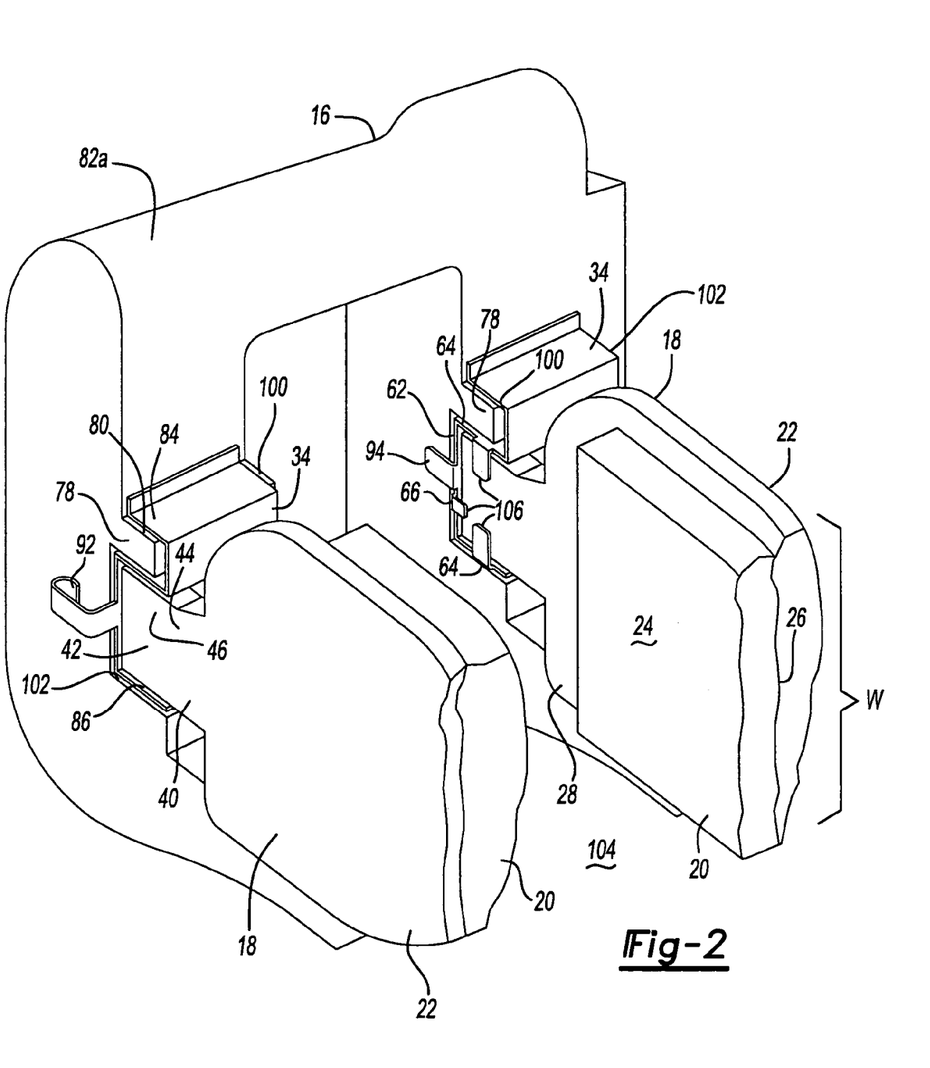
FIG. 2 is a partial perspective view of a brake caliper and a pair of brake elements showing mounting clips having a plurality of brake pad retaining members connected thereto constructed in accordance with various embodiments of the present invention.
Figure 3:
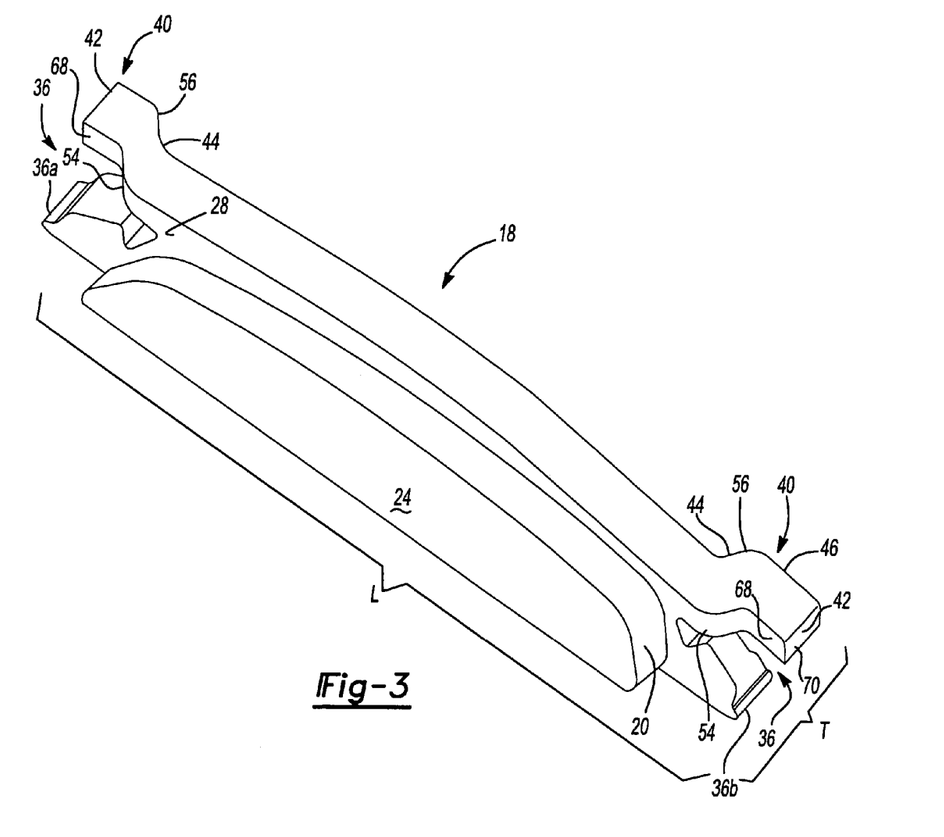
FIG. 3 is a partial perspective view of FIG. 2 showing one of the brake elements with a friction member, a structural backing, and a lug member.

With references to FIGS. 1, 2 and 3, each of the brake elements 18 includes a friction member 20 that is connected to a structural backing 22. It will be appreciated that the friction member 20 is the portion of the brake element 18 that makes contact with the rotor 12 in the disc brake system 10, which ultimately slows the motion of the vehicle (not shown). When in contact with the rotor 12, the friction member 20 heats and wears, in the form of gas and debris, and as such, the friction member 20 is considered the expendable portion of the disc brake system 10.

The friction member 20 of the present invention can be configured in various shapes and thickness and mounted in various ways on the structural backing 22. One such exemplary configuration of the friction member 20 is disclosed in commonly assigned United States patent Application titled Friction Materials Configuration and Method of Manufacture for Brake Applications, Ser. No. 10/696,934, filed Oct. 30, 2003, which is hereby incorporated by reference as if fully set forth herein.

Moreover, the friction member 20 of the present invention can have multiple formulations, one or more of which can be mounted to the structural backing 22. One such exemplary formulation is disclosed in commonly assigned United States patent Application titled Brake Friction Material Including Titanium Dioxide Particles, Ser. No. 10/345,713, filed Jan. 16, 2003. Furthermore, the friction member 20 of the present invention can be mounted to the structural backing 22 with many different methods. One such mounting method is disclosed in commonly assigned U.S. Pat. No. 5,073,099, titled Hot Press for Heat Forming a Disc Pad, issued Dec. 17, 1991, which is hereby incorporated by reference as if fully set forth herein.

The structural backing 22 can be typically made of one or more various steel formulations know to one skilled in the art that are suitable for vehicular brake applications. It will be appreciated that many materials may be suitable that can otherwise withstand the stresses of a vehicular braking environment and an environmental regime in which the typical disc brake system 10 is located.

The friction member 20 has a contact face 24 that makes contact with the rotor 12 and a mating face 26 (FIG. 2) that connects to an inboard face 28 of the structural backing 22. It will be appreciated that the inboard face 28 of the structural backing 22 refers to a face of the structural backing 22 that faces the rotor 12 in a typical installation, as shown in FIG. 1. The structural backing 22 has an overall shape that is configured to complement an interior portion 30 of the caliper 16 in which it is located. It will be additionally appreciated that the caliper 16 includes one or more pistons 32 that clamp the brake elements 18 against the rotor 12. The pistons 32 can be located on one or both sides of the caliper 16. It follows that the brake elements 18 must move within the caliper 16 from a rest position to a clamping position. As such, one or more mounting clips 34 can be introduced and disposed between the structural backing 22 and the caliper 16 to among other things reduce sliding friction therebetween.

Other components or designs may be included in the disc brake system 10 to address the motion of the respective brake elements 18. As such, an exemplary disc brake systems using pins or rails to guide or further facilitate the motion of the brake pads 18 are shown in commonly assigned U.S. Pat. No. 6,286,636, issued Sep. 11, 2001 titled Disc Brake and in copending U.S. patent application Ser. No. 10/395,925 filed Mar. 24, 2003 titled One Piece Sliding Brake Caliper, both of which are incorporated by reference as if fully set forth herein.

With reference to FIG. 3, the structural backing 22 includes edge members 36. The edge members 36 can include a forward edge member 36a and a rear edge member 36b, relative to the front and rear ends of a typical vehicle (not shown). It will be appreciated that typically the brake elements 18 are positioned so that the contact face 24 of the friction member 20 is oriented so that the face of the friction member 20 is parallel and opposed to the associated face 38 of the rotor 12 (FIG. 1) with which the friction member 20 makes contact. As such, the length of the brake element 18, shown as distance "L," is generally from one edge member 36 to another edge member 36. While a thickness of the brake element 18, shown as distance "T," is the distance that includes the thickness of the friction member 20 and the thickness of the structural backing 22. While a width of the brake element 18, shown as distance "W," is a distance from a side of the structural backing 22 adjacent to the edge member 36 to the opposite side, as shown in FIG. 2.

The edge members can be configured to include edge projections 40. The edge projections 40 can be configured to include a lug member 42 connected to the structural backing 22 by a bent member 44. It will be appreciated that the edge projections 40 including the lug member 42 and the bent member 44 can also be referred to as offset pad abutments. The bent member 44 can be configured so that the lug member 42 can be spaced back from the structural backing 22 relative to the friction member 20. Furthermore, the lug member 42 can be configured so that it is parallel to the structural backing 22. More specifically, a lug member rear face 46 can be parallel to the structural backing rear face 48 and a lug member front face 50 can be parallel to a structural backing front face 52. An exemplary offset pad abutment is also disclosed in commonly assigned U.S. Pat. No. 6,367,594, entitled Disc Brake Pressure Plate with Abutment Ears having Laterally Displaced Sections, issued Apr. 9, 2002, which is hereby incorporated by reference in its entirety.

It will be appreciated that the lug member 42 need not be parallel to the structural backing 22 to maintain operability of present invention. Hence, the lug member 42 can be configured at various angles relative to structural backing 22 and still operate within the caliper 16. It will additionally be appreciated that lug member 42 can be located at various positions on the edge member 36. Additionally, the lug member 42 formed from the forward edge member 36a can be identical or dissimilar in shape and location to the lug member 42 formed from the rear edge member 36b.

The bent member 44 includes a first bend radius 54 and a second bend radius 56. It will be appreciated that if the lug member 42 is parallel to the structural backing 22, the sum of the first bend radius 54 and the second bend radius 56 must be about ninety degrees. The lug member 42, however, need not be parallel to the structural backing 22 to ensure operability of the present invention. Moreover, the lug member 42 may be configured so that it is orthogonal to the structural backing 22 or at any such angle between the angle at which the lug member 42 is orthogonal to the structural backing 22 and the angle at which the lug member 42 is parallel thereto.

With reference to FIGS. 1 and 2, it will be appreciated that the outboard brake element 18b and the inboard brake element 18a can be identical. In the disc brake system 10, if the shapes of the brake pads 18 are identical, the outboard brake pad 18b and the inboard brake pad 18a can be readily interchanged. It will be appreciated that the brake pads 18 need not be identical. It will further be appreciated that if the brake pads 18 are interchanged, the contact face 24 of the friction member 20 should face the rotor 12 to ensure optimal performance.

If the shapes of the brake pads 18 are not identical, the outboard element 18b and the inboard element 18a may not be interchangeable. In the disc brake system 10, therefore, the inboard and the outboard brake elements (18a, 18b) must be positioned in an inboard brake element mounting location 58 and an outboard brake element mounting location 60, respectively, to affect optimal performance of the disc brake system 10.

Figure 16:
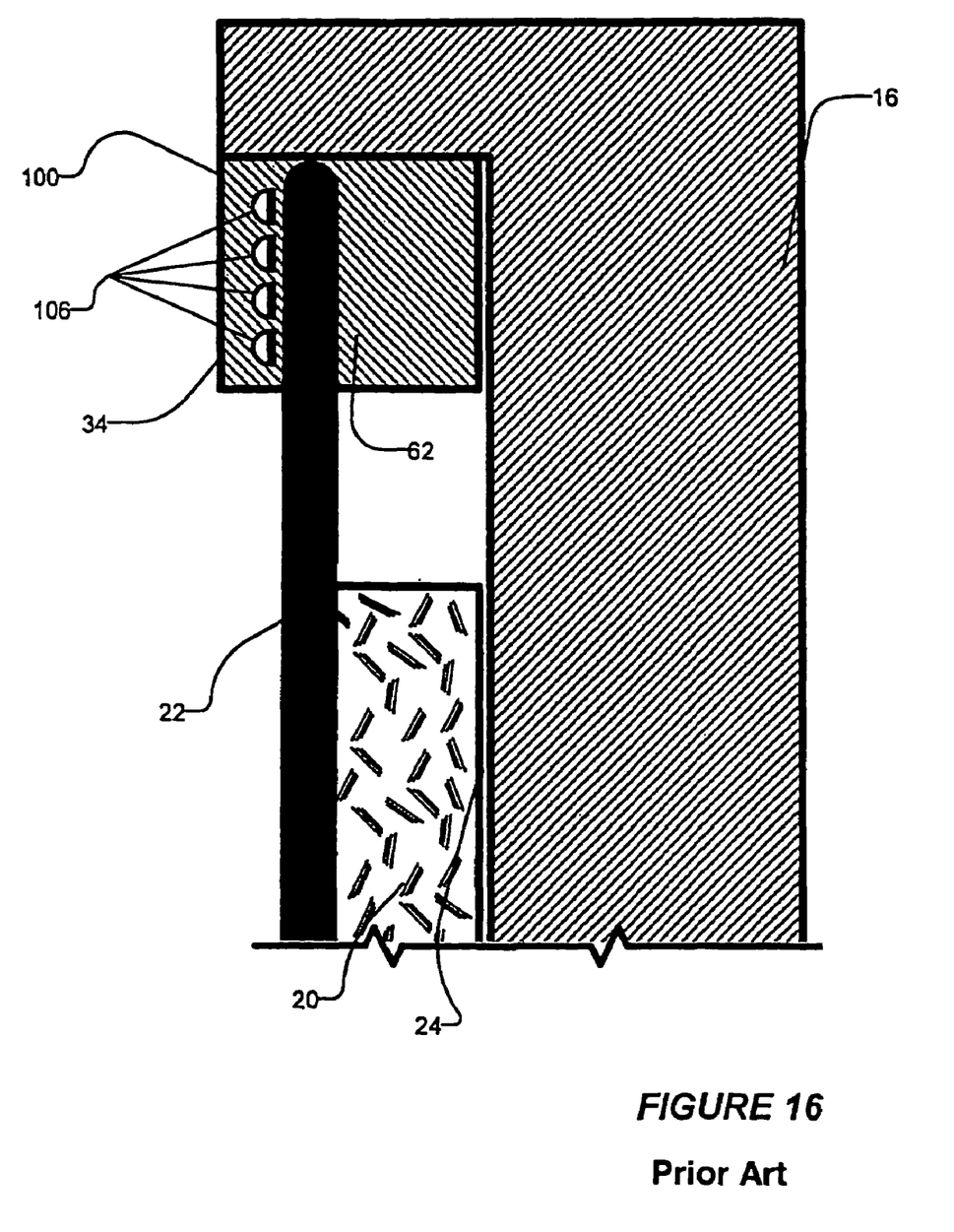
FIG. 16 is a simplified representation of a conventional brake element installed improperly such that the friction member of the brake element does not properly face the rotor.

Whether the shapes of the brake pads 18 are identical or dissimilar, the outboard element 18b or the inboard element 18a may be installed in an incorrect orientation but may be installed in the correct outboard and inboard brake element mounting locations 58, 60. In previous implementations, for example, the brake element 18 may have been installed incorrectly, so that the friction member 20 faces away from the rotor 12, as shown in FIG. 16. In this situation, braking power can be greatly reduced.

With reference to FIG. 2, the lug member 42 can be configured to slidingly connect with the caliper 16. The caliper 16 includes a brake pad channel 62 in which the lug member 42 travels as the brake pad 18 moves from the rest position to the clamping position. While the lug member 42 is in sliding engagement with the brake pad channel 62, it will be appreciated that at least a portion of the edge member 36 (FIG. 3) may also be in sliding engagement with brake caliper interior portions 30 (FIG. 1).

With reference to FIGS. 2 and 3, the brake pad channel 62 includes brake pad channel walls 64 and a brake pad channel bottom 66. The lug member 42 can be configured to have a complimentary shape so that the lug member can slidingly engage the brake pad channel 62. To that end, the lug member 42 can include lug member sides 68 and a lug member bottom 70. The mounting clip 34, which is discussed in greater detail, can be disposed between the edge member 36 of the brake pad 18 and the brake caliper interior portions 30 (FIG. 1).

Figure 13:
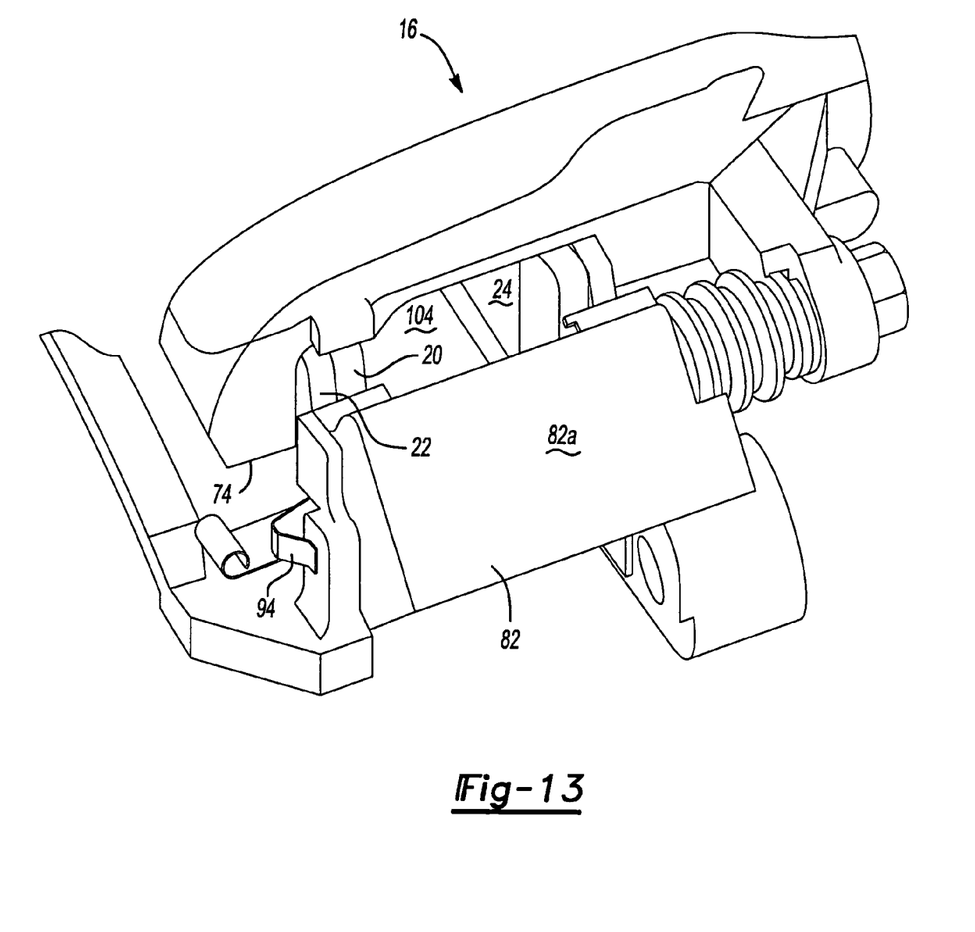
FIG. 13 is a partial perspective view of a support bracket of the brake caliper.

With reference to FIGS. 1, 3 and 13, the caliper 16 further includes the piston 32 and a piston face 72, which may push on one of the brake elements 18, thereby clamping the caliper 16 and the brake elements 18 against the rotor 12. The caliper 16 also includes a plurality of fingers 74. The plurality of fingers 74 is distal from the piston 32, such that the plurality of fingers 74 can be connected to the other associated brake pad 18. For example, the inboard brake pad 18a may be connected to the piston face 72, while the outboard brake pad 18b may be connected to the plurality of fingers 74. It will be appreciated that the plurality of fingers 74 is a section of the caliper 16 opposite the portion of the caliper that contains the piston 32. The caliper 16 can otherwise be configured such that a wall 76 opposite the piston 32 is continuous and not formed of individual fingers. In addition, the wall 76 can be configured with one or more additional pistons 32, so that the caliper can have opposed pistons 32. In an opposed-piston arrangement, the caliper 16 can be configured with one or more pistons 32 on each side of the caliper 16, all of which push against the associated brake elements 18. Each of the brake pads 18, whether connected to one or more pistons 32, the plurality of fingers 74 or a solid wall surface 76, can slidingly engage the brake pad channel 62.

The brake system 10 as illustrated in FIG. 13 includes a support bracket 82 connected to the caliper 16. It will be appreciated that in configurations where the caliper 16 includes additional brackets, such as the support bracket 82, the caliper 16 is commonly referred to as the caliper housing 16a, while the caliper housing 16a and support bracket 82 are collectively referred to the disc brake system 10 or caliper assembly 10. It will be additionally appreciated that the caliper 16, as shown in FIG. 2, can be configured as integral to the caliper 16 or a separate component such as the support bracket 82.

With reference to FIG. 2, the caliper 16 can further include mounting flanges 78. One or more of the mounting flanges 78 may be complimentary to the brake pad channel 62 such that one wall 64 of the brake pad channel 62 may form one mounting flange wall 80. For example, the caliper 16 may include two mounting flanges 78 with the brake pad channel 62 formed therebetween. The brake pad channel 62 can be recessed further into the caliper 16, such that the wall heights of the mounting flanges 78 are asymmetrical. The brake pad channel 62, however, need not be recessed. Moreover, the brake pad channels 62 and the mounting flange 78 are generally configured with a rectangular shape, but may be rounded, chamfered, slotted, or non-orthogonal to improve packaging and/or effectiveness of the disc brake system 10.

Figures 11A, 11B, 12A, 12B:
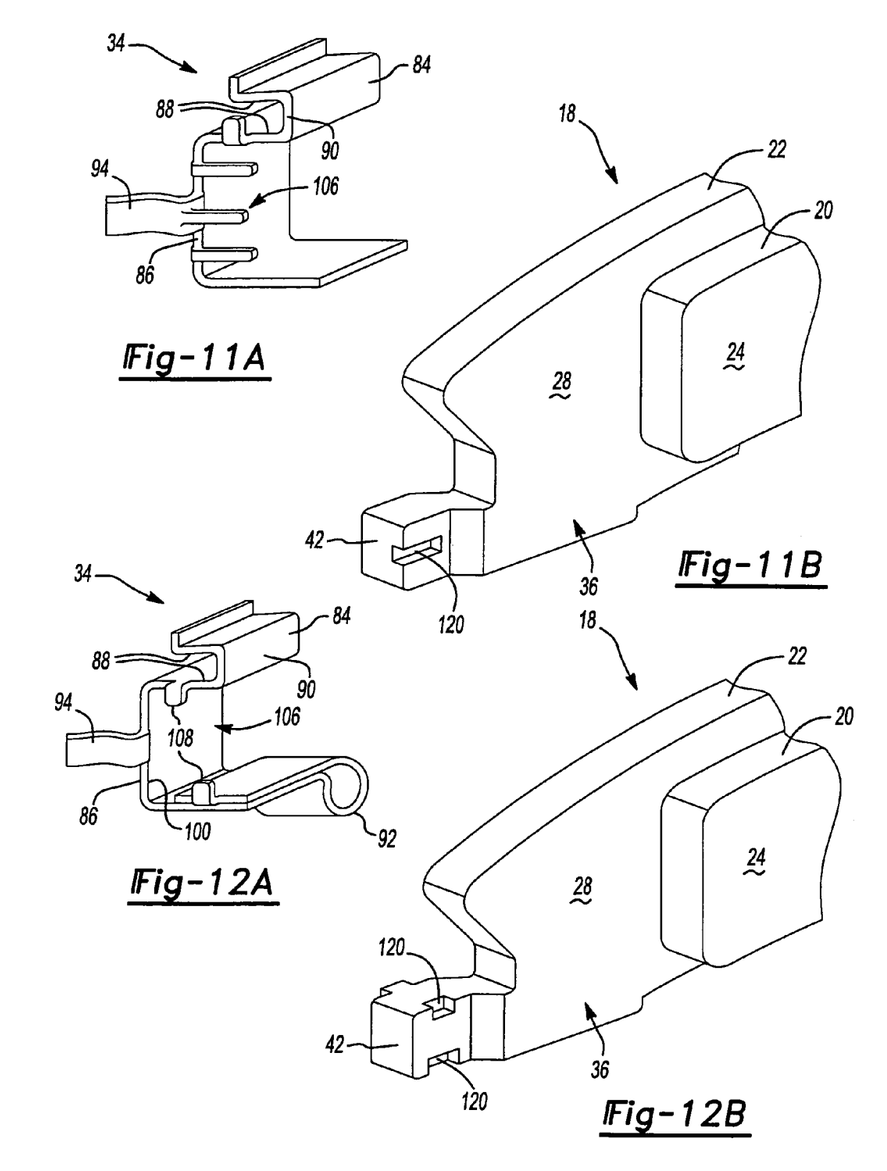
FIG. 11A is similar to FIG. 7 but shows the plurality of brake pad retaining members configured as a plurality of prongs one of which is configured to engage an edge member constructed in accordance with the various embodiments of the present invention.
FIG. 11B is a partial perspective view of the edge member of one of the brake elements wherein the lug member is configured to engage one of the prongs constructed in accordance with the various embodiments of the present invention.
FIG. 12A is similar to FIG. 7 but shows the plurality of the brake pad retaining members configured to engage the edge member constructed in accordance with the various embodiments of the present invention.
FIG. 12B is similar to FIG. 11B but shows the edge member of one of the brake elements configured to engage the plurality of pad retaining members constructed in accordance with the various embodiments of the present invention.

With reference to FIGS. 1, 2, and 11, it will be appreciated that one or more of the mounting flange 78 and the brake pad channel 62 may be formed in the interior portions 30 of the caliper 16. The mounting flange 78 and the brake pad channel 62 may also be formed in one or more support brackets 82 and then connected to the caliper 16. The caliper 16, for example, can be configured with a support bracket 82 or configured with the mounting flange 78 and the brake pad channel 62 integral to the caliper 16. It will be appreciated that the support bracket 82 is illustrated in FIG. 11 with a leading edge portion 82a and trailing edge portion (not shown). As such, the support bracket 82 is configured to fit over a caliper housing 16a and hold the edge members 36. The support bracket 82 can, however, be configured as a multiple piece component or otherwise integrates as a unitary component of the caliper 16.

Figures 4, 5, 6:
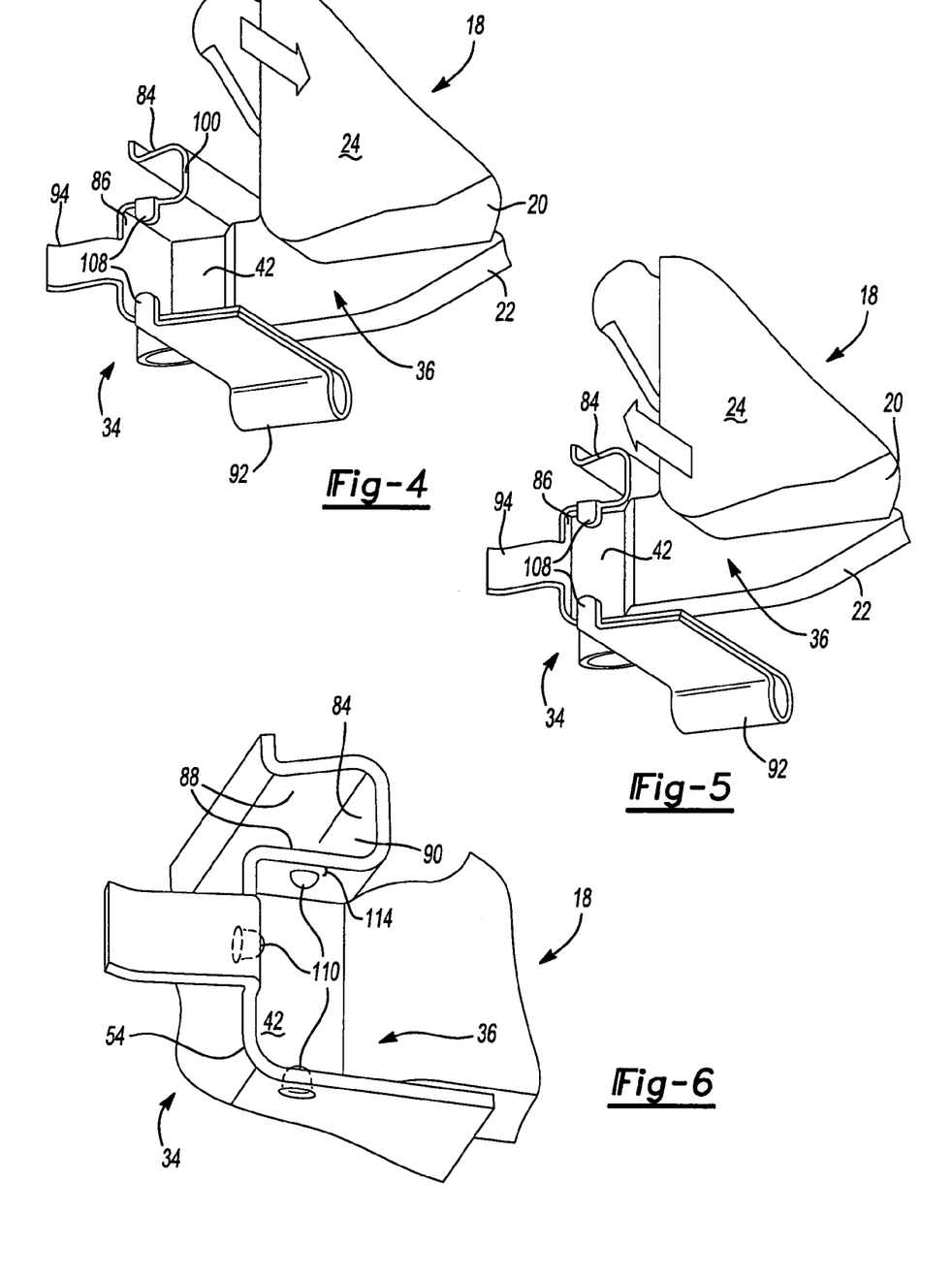
FIG. 4 is a partial perspective view of one of the brake elements wherein the lug member is slidingly engaged with the mounting clip, the mounting clips having a plurality of brake pad retaining members that are configured as upturned tabs constructed in accordance with the various embodiments of the present invention.
FIG. 5 is similar to FIG. 4 but shows the brake element in a forward position in the mounting clip.
FIG. 6 is a partial perspective view of one of the brake elements wherein the lug member is slidingly engaged with the mounting clip, the mounting clip having a plurality of brake pad retaining members that are configured as dimple members constructed in accordance with the various embodiments of the present invention.
Figure 7:
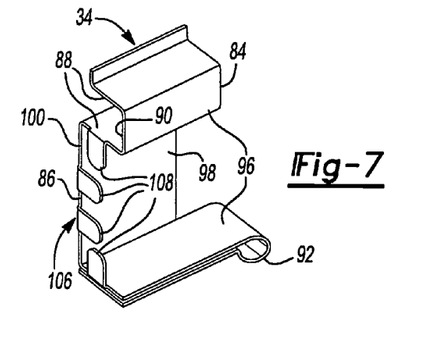
FIG. 7 is a perspective view of the mounting clip showing the plurality of the brake pad retaining members constructed in accordance with the various embodiments of the present invention.
Figure 8:
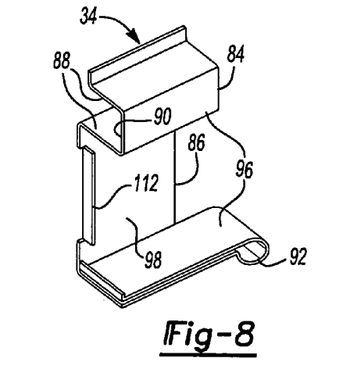
FIG. 8 is similar to FIG. 7 but shows the plurality of brake pad retaining members configured as folded portions constructed in accordance with the various embodiments of the present invention.
Figures 9, 10:
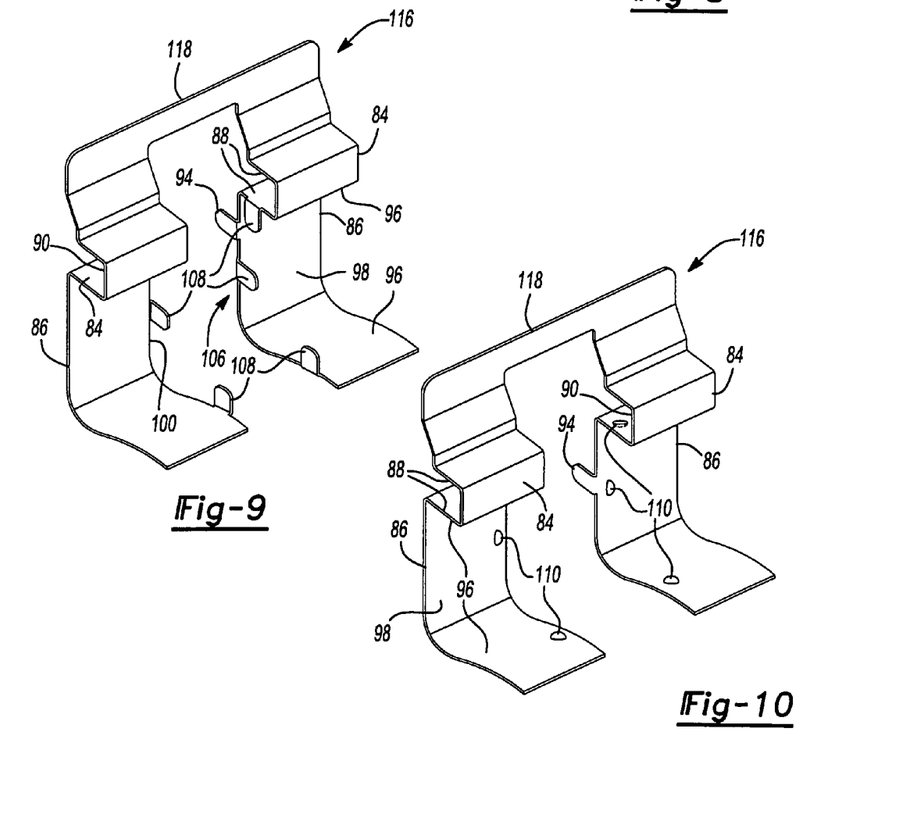
FIG. 9 is a perspective view of the mounting clip configured to bridge the rotor gap and includes the plurality of the brake pad retaining members constructed in accordance with the various embodiments of the present invention.
FIG. 10 is similar to FIG. 9 but shows the plurality of the brake pad retaining members configured as the dimple members constructed in accordance with the various embodiments of the present invention.

With reference to FIG. 2 and FIGS. 7 through 10, the mounting clip 34 includes a caliper holding portion 84 and a brake pad holding portion 86. The caliper holding portion 84 is configured to hold the mounting clip 34 in position with the caliper 16. The brake pad holding member 86 is configured to hold the brake pad 18 in position within the caliper 16, as the brake pad 18 moves from the rest position, shown in FIG. 4, to the compressed condition shown in FIG. 5. It will be appreciated that the mounting clip 34 is releaseably connected to the caliper 16 and can be removed and replaced as needed.

The caliper holding portion 84 can be configured such that it has opposing walls 88 and a bottom portion 90, wherein the bottom portion 90 contacts the opposing walls 88 forming a "U" or channel shape. The caliper holding portion 84 can be further configured to connect to the mounting flange 78 on the caliper 16. Spring members 92 and/or position tangs 94 may be used to further position and secure the caliper holding portion 84 to the mounting flange 78. The position tangs 94 can be connected along the edges of the mounting clip 34 and, among other things, serves to secure the mounting clip 34 within the caliper 16. Moreover, the spring member 92 can be configured so a spring force assists in positioning the brake element 18 within the caliper 16 or the support bracket 82.

The mounting clip 34 includes the brake pad holding portion 86. The brake pad holding portion 86 is configured to hold the mounting clip 34 in position with the caliper 16 and hold the brake pad 18 in position with the caliper 16. The brake pad holding portion 86 can be configured such that it has opposing walls 96 and a bottom portion 98, wherein the bottom portion 98 contacts the opposing walls 96 forming a "U" or channel shape. The brake pad holding portion 86 can be further configured to connect to the brake pad channel 62 and/or other portions of the caliper 16 or support bracket 82 by using, for example, spring members 92 and/or position tangs 94 as discussed above.

It will be appreciated that brake pad holding portion 86 of the mounting clip 34 can be positioned in the brake pad channel 62 of the caliper 16 or the support bracket 82 so that the brake pad holding portion 86 is disposed between the edge member 36 and the brake pad channel 62. More specifically, the opposing walls 64 and bottom 66 of the brake pad channel 62 have an edge that is closer to the rotor gap and an edge that is distal to the rotor gap. As such, the edge that is closer to the rotor gap can be referred to as an inboard edge 100 and the edge distal from the rotor gap is an outboard edge 102. It will be further appreciated that motion of the edge members 36 within the brake pad channel 62 is between the inboard edge 100 of the brake pad holding portion 86 and the outboard edge 102. It will be additionally appreciated that absent the rotor 12 (FIG. 1), the brake pads 18 may fall into a rotor gap 104 (FIG. 13) as the edge member 36 moves beyond the inboard edge 100, thus falling into the rotor gap 104.

With reference to FIGS. 2 and 13, the brake pad channel 66 can be configured within the caliper 16, as a one piece assembly or can be configured in the support bracket 82. The support bracket 82 can be connected to the caliper housing 16a as a two piece assembly. As such, the brake pad channel 66, as illustrated in FIG. 2, can be formed from the caliper housing 16a or the leading edge member 82a of the support bracket 82.

With reference to FIGS. 4, 5, 7, 9, 11a and 12a the brake pad holding portion 86 can include a plurality of brake pad retaining members generally indicated by reference number 106. The pad retaining members 106 can be configured as upturned tabs 108 that are connected to the inboard edge 100 of the brake pad holding portion 86. The upturned tabs 108 may be configured so that they are about orthogonal to the respective surface to which they are connected and face into the brake pad channel 62. In the various embodiments illustrated, for example, one of the upturned tabs 108 may be rectangular with rounded edges and connected to the inboard edge 100 of the bottom member 90 of the brake pad holding portion 86, such that the upturned tab 108 is configured to abut the edge member 36 (FIG. 2) in the brake pad channel 62. The mounting clip 34 can also be configured so that single clip is used and that clips bridges the rotor clearance gap. This configuration shown in FIGS. 9 and 10 can be referred to as a double clip 116.

It will be appreciated that one or more upturned tabs 108 may be mounted to the opposing walls 88 of the brake pad holding portion 86 or to the bottom member 90. Moreover, the upturned tabs 108 may be connected to other portions of the mounting clip 34, for example, portions not along the inboard edge 100. It will also be appreciated that the upturned tabs 108 may be configured in other forms, such as but not limited to dimple members 110 (FIGS. 6 and 10) folded members 112 (FIG. 8), or prongs 118. Furthermore, the dimple members 110 or folded members 112 may be configured such that they are positioned an offset distance 114 in from the inboard edge 100 of the mounting clip 34 as shown in FIGS. 6 and 12 through 14. Moreover, the upturned tabs 108, the dimple members 110, the folded members 112 or the prongs 118 can be configured to engage the edge member 36 at retaining member engagement points 120, which can be formed in the lug member 42.

It will be appreciated that the dimple members 110 may be made of the same material as the mounting clip 34 or other suitable materials and then connected thereto. The dimple members 110 may be connected to the mounting clip 34 along the inboard edge 100 or connected the offset distance 114 from the inboard edge 100. It will be further appreciated that neither the upturned tabs 108, the dimple members 110, the folded portions 112 nor similar structures make contact with the rotor 12 (FIG. 1) at any time. In previous implementations, one or more projections (not shown) from the mounting clip 34 would make contact with the rotor, when the brake element 18 was worn after extended use. The projections (not shown) may have been further configured to make a noise to alert the user to excessive wear of the brake element 18. It will be additionally appreciated that because the plurality of brake pad retaining members 106 is not configured to come into contact with the rotor 12 they need not be as robust or consequently as expensive to manufacture when compared to the projections (not shown) configured to contact the rotor 12.

Figure 14:
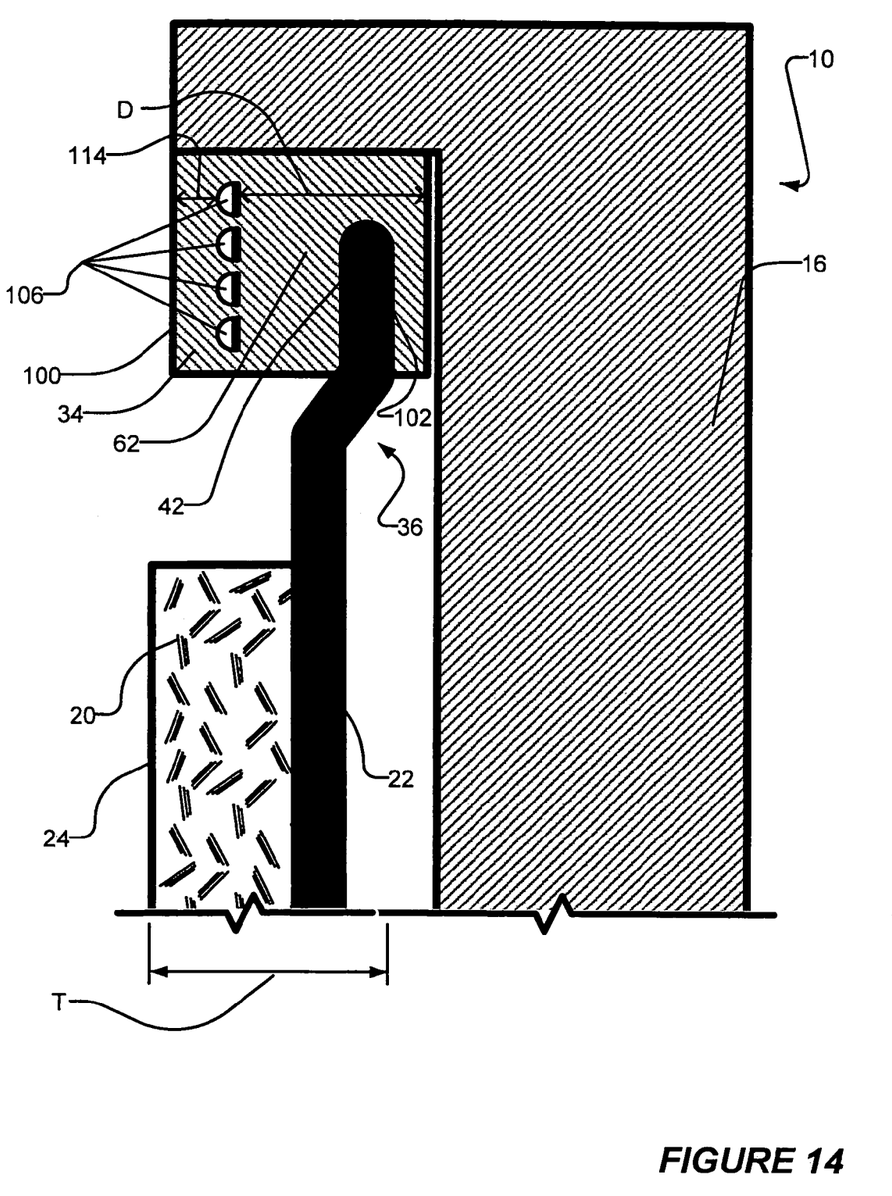
FIG. 14 is a simplified representation of the lug member of the brake element disposed within a brake pad channel of the brake caliper.
Figure 15:
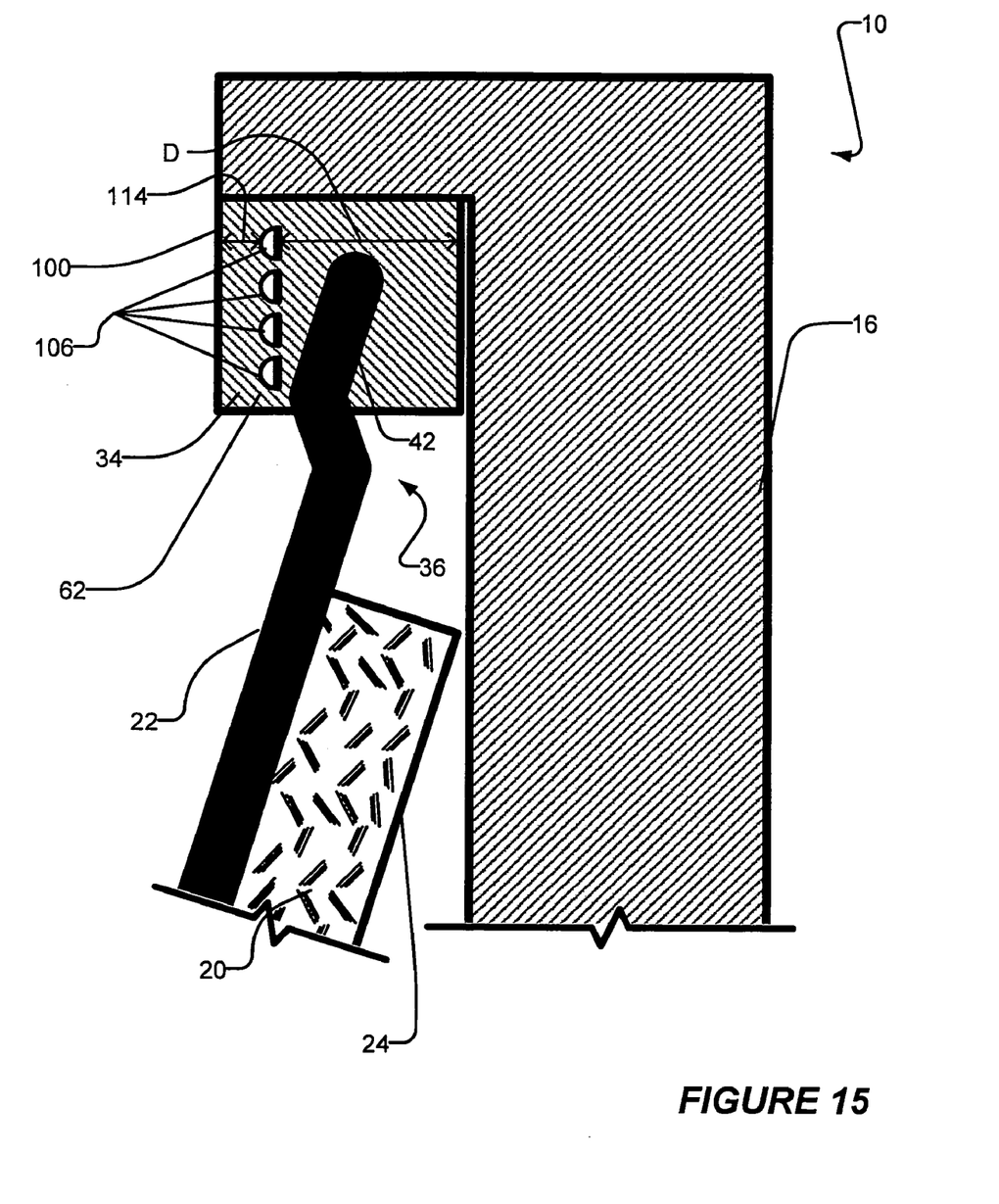
FIG. 15 is similar to FIG. 14 but illustrates the impossibility of installing the brake element improperly in the brake caliper.

With reference to FIGS. 14 through 16, the distance from the plurality of pad retaining members 106 to the interior portion 30 of the caliper 16 that typically abuts the outboard edge 102 of the mounting clip 34 is defined as a length "D." It will be appreciated that the sum of the distance "D" and the offset distance 114 is about the length of the brake pad channel 62. As mentioned earlier the thickness of the brake pad is defined as the length "T." The pad retaining members 106 can be configured so that the length "D" is less than the length "T" (not shown in FIG. 14). More specifically, the distance from the rear face 46 (FIG. 2) of the lug member 42 to the contact face 24 of the friction member 20 can be defined as the length "T." When the length "D" from the pad retaining members 106 to the outboard edge 102 of the mounting clips 34 is less than thickness "T," the brake pads 18 cannot be installed in the disc brake system 10 backwards.

To illustrate this point further, FIG. 14 shows the brake pads 18 installed correctly so that the contact face 24 of the friction member 20 faces the rotor 12 (FIG. 1). As such, the lug member 42 is spaced behind the structural backing 22 relative to the friction member 20. In this arrangement, the lug member 42 can travel until it abuts the plurality pad retaining members 106 (also shown in FIG. 5). In this position, the structural backing 22 and the friction member 20 may extend beyond the pad retaining members 106.

If for some reason the brake pads 18 have fallen out of the caliper 16 and thus need to be re-installed, it will be appreciated that they cannot be re-installed backwards. More specifically, installing backwards is defined as inserting the brake pads 18 in the caliper 16 so that the contact face 24 of the friction member 20 faces the piston face 72 or the caliper fingers 74, rather than correctly facing the rotor 12 as shown in FIG. 14. In the present invention however, the lug member 42 can be spaced behind the structural backing 22, such that the thickness "T" from the contact face 24 of the friction member 20 to the rear face 46 of the lug member 42 is greater than the distance "D" from the plurality of retaining members 106 to the outboard edge 102 of the mounting clip 34. In this arrangement, the brake pads 18 cannot be inserted into the mounting clips 34 as the distance "D" created between the plurality of retaining members 106 and the caliper 16 is too small, as depicted in FIG. 15. Because of this configuration, the brake pads 18 can only be installed into the caliper 16 in the correct orientation where the contact face 24 of the friction member 20 faces the rotor 12.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A clip disposed between a brake caliper having a brake pad channel and a brake pad having an edge member, wherein the edge member moves in the brake pad channel between a rotor gap and a caliper housing, the clip comprising:
   a pad holding portion slidingly engaged with the edge member, the pad holding portion extending between the rotor gap and the caliper housing; and
   a plurality of pad retaining members formed on said pad holding portion, said pad holding portion including a channel portion such that said edge member is slidable in said channel portion with respect to said pad holding portion, said pad holding channel portion positioning the clip in the brake pad channel said channel portion including a bottom member and opposed wall members having an inboard edge adjacent to the rotor gap, said plurality of said pad retaining members connected to and extending inwardly from an inboard portion of said pad holder portion which is adjacent to said rotor gap and wherein said plurality of said pad retaining members are configured to prevent the brake pad from falling into the rotor gap;
   a lug member formed from the edge member, wherein said lug member is configured to travel in the brake pad channel, wherein the brake pad further includes a friction member and a structural backing, and wherein said lug member is spaced behind said structural backing.

2. The clip of claim 1, wherein a lug member face is about parallel to said structural backing.

3. The clip of claim 1, wherein said pad holding portion is configured such that the brake pad cannot be installed in the caliper unless said friction member is facing said rotor gap.

4. The clip of claim 1, wherein said pad holding portion includes the inboard edge that is adjacent to the rotor gap and an outboard edge distal from said inboard edge, and wherein said plurality of pad retaining members are connected to said pad holding portion an offset distance from said inboard edge.

5. The clip of claim 4, wherein a first distance between said plurality of pad retaining members and said outboard edge is less than a second distance between a lug member rear face and a contact face of said friction member.

6. The clip of claim 1, wherein said plurality of said pad retaining members includes at least one upturned tab te connected to said inboard edge.

7. The clip of claim 1, further comprising a support bracket connected to the brake caliper, said bracket including the brake pad channel.

8. The clip of claim 1, wherein said pad retaining members comprise a plurality of dimples extending inwardly to prevent the brake pad from falling into the rotor gap.

9. The clip of claim 8, wherein said plurality of dimples are positioned an offset distance from the inboard edge of said channel portion.

10. The clip of claim 1, wherein said pad retaining members comprise a plurality of prongs extending inwardly to prevent the brake pad from falling into the rotor gap.

11. A disc brake system including a caliper having a rotor gap comprising:
   a mounting clip having an inboard edge and an outboard edge;
   a plurality of brake pad retaining members connected to said mounting clip, wherein a first distance is between said plurality of said brake pad retaining members and said outboard edge;
   a brake pad having a friction member attached to a structural backing; and
   a lug member formed from and spaced between said structural backing, wherein a second distance is between said lug member and said friction member, and wherein said second distance is greater than said first distance.

12. The disc brake system of claim 11, wherein said mounting clip is configured such that said brake pad cannot be installed in the caliper unless said friction member is facing the rotor gap.

13. The disc brake system of claim 11, wherein said plurality of said pad retaining members includes at least one upturned tab connected to said inboard edge.

14. The disc brake system of claim 11, wherein said plurality of said pad retaining members includes at least one dimple member connected to said pad holding portion adjacent to said inboard edge.

15. The disc brake system of claim 11, wherein said pad retaining members comprise a plurality of dimples extending inwardly to prevent the brake pad from falling into the rotor gap.

16. The disc brake system of claim 15, wherein said plurality of dimples are positioned an offset distance from the inboard edge of said channel portion.

17. The disc brake system of claim 11, wherein said pad retaining members comprise a plurality of prongs extending inwardly to prevent the brake pad from falling into the rotor gap.

18. A clip disposed between a brake caliper and a brake pad, wherein the brake caliper is configured to press the brake pad against a rotor, the clip comprising:
- a pad holding portion connected to said caliper, said pad holding portion including a channel portion extending between a rotor gap and a caliper housing, said channel slidingly engaged with an edge member of the brake pad and including a bottom member and opposed wall members having an inboard edge adjacent to the rotor gap, and
- a plurality of pad retaining members connected to and extending inwardly from an inboard portion of said pad holder portion which is adjacent to said rotor gap and wherein said plurality of said pad retaining members do not contact said rotor;
- a lug member formed from the edge member, wherein said lug member is configured to travel in the brake pad channel, wherein the brake pad further includes a friction member and a structural backing, and wherein said lug member is spaced behind said structural backing.

19. A disc brake system comprising:
- a caliper having at least one piston, said caliper includes a rotor gap;
- a pair of brake pads having a friction member, a structural backing and a lug member formed from an edge member of the pair of brake pads, the lug member being spaced behind said structural backing, said pair of brake pads connected to said caliper, wherein said caliper pushes said pair of brake pads toward said rotor gap;
- a clip disposed between said pair of brake pads and said caliper, said clip including a pad holding portion slidingly engaged with the edge member of said pair of brake pads and being adapted to reduce sliding friction between said pair of brake pads and said caliper, a channel portion formed in said clip, said channel portion including a bottom member and opposed wall members having an inboard edge adjacent to the rotor gap,
- a plurality of brake pad retaining members connected to and extending inwardly from an inboard portion of said pad holder portion which is adjacent to said rotor gap, said plurality of brake pad retaining members being formed on each sides of said rotor gap, said plurality of brake pad retaining members located between said pair of brake pads and said rotor gap, wherein said plurality of brake pad retaining members are configured to prevent said brake pads from falling into said rotor gap.

20. The disc brake system of claim 19, wherein said plurality of said brake pad retaining members are configured to not contact a rotor.

* * * * *

UNITED STATES PATENT AND TRADEMARK OFFICE
CERTIFICATE OF CORRECTION

PATENT NO. : 7,318,503 B2  
APPLICATION NO. : 10/831928  
DATED : January 15, 2008  
INVENTOR(S) : Muhammad Farooq Page 1 of 1

It is certified that error appears in the above-identified patent and that said Letters Patent is hereby corrected as shown below:

Col. 10, line 24
"after "tab" please delete "te""

Signed and Sealed this

Thirteenth Day of May, 2008

JON W. DUDAS
*Director of the United States Patent and Trademark Office*